(12) United States Patent
Esser

(10) Patent No.: US 6,575,197 B2
(45) Date of Patent: Jun. 10, 2003

(54) DOUBLE-LAYER PIPE FOR FLUIDIC TRANSPORT OF ABRASIVE SOLIDS

(75) Inventor: Alexander Esser, Warstein (DE)

(73) Assignee: Esser-Werke KG, Warheim (DE)

( * ) Notice: Subject to any disclaimer, the term of this patent is extended or adjusted under 35 U.S.C. 154(b) by 0 days.

(21) Appl. No.: 10/213,131

(22) Filed: Aug. 6, 2002

(65) Prior Publication Data

US 2003/0041912 A1 Mar. 6, 2003

Related U.S. Application Data

(60) Provisional application No. 60/322,081, filed on Sep. 14, 2001.

(30) Foreign Application Priority Data

Sep. 4, 2001 (DE) .......................... 101 43 187

(51) Int. Cl.[7] .................................. F16L 9/00
(52) U.S. Cl. .................. 138/109; 138/143; 138/146; 138/149; 285/55; 285/418
(58) Field of Search ................. 138/143, 146, 138/149, 109; 285/53, 55, 145.4, 235, 370, 418, 416, 286.1

(56) References Cited

U.S. PATENT DOCUMENTS

| | | | | |
|---|---|---|---|---|
| 4,366,971 A | * | 1/1983 | Lula | 285/55 |
| 4,509,776 A | * | 4/1985 | Yoshida et al. | 285/55 |
| 4,556,240 A | * | 12/1985 | Yoshida | 285/55 |
| 5,044,670 A | * | 9/1991 | Esser | 285/55 |
| 5,228,479 A | * | 7/1993 | Thomas | 138/89 |
| 5,275,440 A | * | 1/1994 | Esser | 138/149 |
| 5,379,805 A | * | 1/1995 | Klemm et al. | 138/109 |
| 5,813,437 A | * | 9/1998 | Esser | 138/109 |
| 6,305,429 B1 | * | 10/2001 | Wech et al. | 138/149 |
| 6,325,106 B1 | * | 12/2001 | Esser | 138/96 T |
| 6,338,366 B1 | * | 1/2002 | Williams | 138/149 |
| 6,387,535 B1 | * | 5/2002 | Mantel | 138/143 |

FOREIGN PATENT DOCUMENTS

DE      30 34 800 A1     4/1982

* cited by examiner

*Primary Examiner*—James Hook
(74) *Attorney, Agent, or Firm*—Henry M. Feiereisen

(57) ABSTRACT

A double-layer pipe for fluidic transport of abrasive solids, includes a hardened inner pipe portion of steel, an outer pipe portion of weldable steel to surround the inner pipe portion, and terminal coupling collars made of weldable steel. Disposed between the inner pipe portion and the outer pipe portion is a heat-insulating layer which is made of a combustible, non-metallic material.

6 Claims, 1 Drawing Sheet

DOUBLE-LAYER PIPE FOR FLUIDIC TRANSPORT OF ABRASIVE SOLIDS

CROSS-REFERENCES TO RELATED APPLICATIONS

This application claims the benefit of prior filed provisional application, Appl. No. 60/322,081, filed Sep. 14, 2001, pursuant to 35 U.S.C. 119(e), the subject matter of which is incorporated herein by reference.

This application claims the priority of German Patent Application, Serial No. 101 43 187.2, filed Sep. 4, 2001, pursuant to 35 U.S.C. 119(a)-(d), the subject matter of which is incorporated herein by reference.

BACKGROUND OF THE INVENTION

The present invention relates, in general, to a double-layer pipe for fluidic transport of abrasive solids, e.g. concrete.

German patent publication DE 30 34 800 discloses a double-layer pipe having a hardened inner pipe portion to provide a longest possible wearing resistance with respect to the solid being transported. The thickness of the hardened layer on the inner surface depends essentially on the job site where the double-layer pipe is employed. In comparably thin-walled double-layer pipes, as predominantly used for transport of concrete, the wall of about 2 mm thickness is normally hardened throughout.

The inner pipe portion is ensheathed by an outer pipe portion, which is shock-resistant and also weldable. The shock resistance is relevant in particular during transport of a double-layer pipe from the manufacturing factory to the assembly site because such a transport is normally subject to rough handling.

Coupling collars are oftentimes secured to the ends of the double-layer pipe and connected with neighboring double-layer pipes by clamps or bolts to form a pipeline.

Since the pipe portions used for fabricating the double-layer pipe have generally great manufacturing tolerances, the inner pipe portions rest against the outer pipe portions only spotwise. After joining the inner pipe portions with the outer pipe portions, heat applied upon the inner pipe portions for their hardening finds much better heat transfer conditions at the contact areas compared to the zones, where air gaps are present. In other words, heat dissipates to the outside. As a result, some areas of the inner pipe portions are heated to the temperature of 830° C., required for the hardening process, whereas other areas are not. When the inner pipe portions are quenched to effect a hardening, regions of the inner pipe portions will be hardened while other regions will not or at least not sufficiently in view of the inadequate heating temperature. The wearing resistance of double-layer pipes is thus not the same in all inner surface areas. Therefore, coarseness, e.g., through overheating, cracks in view of heightened tension between differently heated regions, and in particular also a peeling of the inner pipe portions, when the concrete being transported bends the worn-out inner pipe portions inwardly, are encountered, so that plug formation may be caused, leading to an interruption of the transport flow.

It would therefore be desirable and advantageous to provide an improved double-layer pipe for fluidic transport of solids, which obviates prior art shortcomings and which is configured to allow an even heating of the inner pipe portion over the length as well as over the circumference to thereby realize a more even hardness of the inner pipe portion.

SUMMARY OF THE INVENTION

According to one aspect of the present invention, a double-layer pipe for fluidic transport of abrasive solids, includes a hardened inner pipe portion of steel; an outer pipe portion of weldable steel; terminal coupling collars made of weldable steel; and a heat-insulating layer disposed between the inner pipe portion and the outer pipe portion.

The present invention resolves prior art problems by providing the heat-insulating layer between the inner pipe portion and the outer pipe portion to form a barrier during heating of the inner pipe portion to thereby prevent heat from dissipating to a significant degree from the inner pipe portion to the outer pipe portion. The applied heat remains in the inner pipe portion so that the inner pipe portion, especially when thin pipe walls are involved, can be heated evenly within a very narrow temperature window. When the inner pipe portion is then quenched, a markedly even hardness is realized over the entire circumference as well as length of the inner pipe portion. The service life of a double-layer pipe according to the present invention is significantly improved in this way.

A further advantage of the invention is then achieved, when the terminal coupling collars at the ends of the double-layer pipe, regardless of their configuration, are welded to the outer pipe portion. In particular, when thin-walled outer pipe portions are involved, heat generated by the welding process can no longer impact the inner pipe portion via the partition layer between the outer pipe portion and the inner pipe portion in any significant manner and thereby reverse the hardness. Optionally, it may be suitable to apply interiorly a slight cooling action during welding of a coupling collar, especially when a thinwalled inner pipe portion is involved.

The present invention not only realizes a longer service life of a double-layer pipe but the provision of the heat-insulating layer also results in a significantly smaller need for heat energy in order to reach the desired hardness temperature above the $AC^3$ point, and in addition no significant cooling energy is required to prevent during welding of the coupling collars a reversal of the previously produced hardness layer in an inner pipe portion.

According to another feature of the present invention, the heat-insulating layer disposed between the inner pipe portion and the outer pipe portion may be formed by a coating made of a combustible non-metallic material and applied upon the outer surface of the inner pipe portion and/or the inner surface of the outer pipe portion. Tests have shown, that the application of an anti-rust paint upon the outer surface of an inner pipe portion is currently preferred, whereby the anti-rust paint burns off in view of heat impact during hardening to produce a distinct partition layer about the circumference of the inner pipe portion.

BRIEF DESCRIPTION OF THE DRAWING

Other features and advantages of the present invention will be more readily apparent upon reading the following description of currently preferred exemplified embodiments of the invention with reference to the accompanying drawing, in which the sole

DETAILED DESCRIPTION OF PREFERRED EMBODIMENTS

Figure 1:
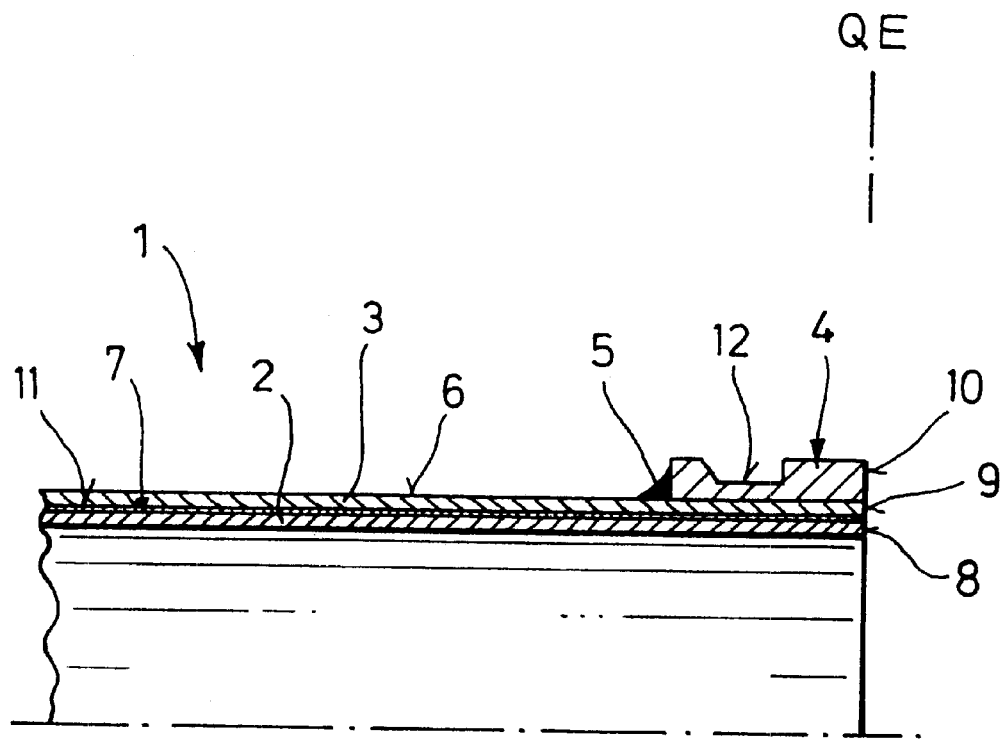
FIG. 1 is a vertical longitudinal section of one half of an end portion of a double-layer pipe according to the present invention.

Turning now to FIG. 1, there is shown a vertical longitudinal section of one half of an end portion of a double-layer pipe according to the present invention, generally designated by reference numeral 1 for fluidic transport of abrasive solids, such as concrete. The double-layer pipe 1 includes a hardened inner pipe portion 2, an unhardened outer pipe portion 3, as well as coupling collars 4 on the ends for connection to neighboring double-layer pipes 1. As only one end of the double-layer pipe 1 is illustrated, only one coupling collar 4 is depicted here. Also, as the coupling collars 4 are of an identical construction, it will be understood by persons skilled in the art that a description of one of the coupling collars 4 is equally applicable to the other coupling collar.

As shown in FIG. 1, the coupling collar 4 is welded via a fillet weld 5 with the outer surface 6 of the outer pipe portion 3, and is formed with a circumferential coupling groove 12 of trapezoidal cross section.

Disposed between the inner pipe portion 2 and the outer pipe portion 3 is a heat-insulating layer 7. The layer 7 is made of a combustible non-metallic material, e.g., an anti-rust paint, and is applied onto the outer surface 11 of the inner pipe portion 2 before the inner pipe portion 2 is joined with the outer pipe portion 3. The inner pipe portion 2 is secured by at least one hardening process in the outer pipe portion 3.

As shown in the non-limiting example of FIG. 1, the inner pipe portion 2 has an end face 8, the outer pipe portion 3 has an end face 9, and the coupling collar 4 has an end face 10, whereby the end faces 8, 9, 10 are oriented in a same transverse plane QE.

While the invention has been illustrated and described as embodied in a double-layer pipe for fluidic transport of abrasive solids, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A double-layer pipe for fluidic transport of abrasive solids, comprising:

a hardened inner pipe portion of steel;

an outer pipe portion of weldable steel;

terminal coupling collars made of weldable steel; and a heat-insulating layer disposed between the inner pipe portion and the outer pipe portion.

2. The pipe of claim 1, wherein the heat-insulating layer disposed between the inner pipe portion and the outer pipe portion is formed by a coating made of a combustible non-metallic material and applied at least onto one of an outer surface of the inner pipe portion and an inner surface of the outer pipe portion.

3. The pipe of claim 2, wherein the coating is an anti-rust paint.

4. A double-layer pipe, comprising:

a hardened inner pipe portion of steel;

an outer pipe portion made of weldable steel and surrounding the inner pipe portion;

a pair of coupling collars made of weldable steel and provided on opposite ends of the outer pipe portion; and a heat-insulating layer disposed between the inner pipe portion and the outer pipe portion.

5. The pipe of claim 4, wherein the heat-insulating layer disposed between the inner pipe portion and the outer pipe portion is formed by a coating made of a combustible non-metallic material and applied at least onto one of an outer surface of the inner pipe portion and an inner surface of the outer pipe portion.

6. The pipe of claim 5, wherein the coating is an anti-rust paint.

\* \* \* \* \*

UNITED STATES PATENT AND TRADEMARK OFFICE
CERTIFICATE OF CORRECTION

PATENT NO. : 6,575,197 B2
DATED : June 10, 2003
INVENTOR(S) : Esser Alexander

It is certified that error appears in the above-identified patent and that said Letters Patent is hereby corrected as shown below:

<u>Title page,</u>
Item [73], Assignee, correct data as follows:
-- Esser-Werke KG, Warstein (DE) --

Signed and Sealed this

First Day of June, 2004

JON W. DUDAS
*Acting Director of the United States Patent and Trademark Office*